United States Patent Office 3,014,932
Patented Dec. 26, 1961

3,014,932
6-NITRO STEROIDS
Howard J. Ringold, Albert Bowers, and George Rosenkranz, Mexico City, Mexico, assignors to Syntex S.A., Mexico City, Mexico, a corporation of Mexico
No Drawing. Filed July 21, 1958, Ser. No. 749,596
Claims priority, application Mexico July 20, 1957
52 Claims. (Cl. 260—397.3)

The present invention relates to cyclopentanophenanthrene derivatives and a process for the production thereof.

More particularly the present invention relates to novel steroid hormones having a 6-nitro group. These hormones are of the androgenic, progestational and antiinflammatory cortical types. In each instance these hormones have been found to have superior properties and activities to those compounds without the nitro group. Thus the novel 6-nitro-testosterone and its 17α-lower alkyl derivatives have a higher androgenic type activity than the corresponding unsubstituted compounds; 6-nitro-17-ethinyl-testosterone, 6-nitro-progesterone and the 17-esters of 6-nitro-17α-hydroxy-progesterone having a luteinizing effect superior to the known compounds without a 6-nitro group; 6-nitro-cortisone, 6-nitro-hydrocortisone, the 9α-halo derivatives of these compounds, as well as the 1-dehydro derivatives thereof are all more potent antiinflammatory agents than the corresponding 6-unsubstituted compounds.

In accordance with the present invention it has been discovered that 6-nitro derivatives of steroidal hormones of the type just referred to may be prepared by treating a $\Delta^5$-3-acyloxy or alkoxy compound with fuming nitric acid preferably in ether solution at a low temperature. Preferably the group at the 3-position is an enol ester or enol ether group whereupon the reaction with the nitric acid or other reagent capable of liberating the $(NO_2)^+$ ion gives in one step the 6β-nitro-3-keto-$\Delta^4$ grouping. These compounds can be converted to 6α-nitro derivatives by alkali treatment. On the other hand treatment of $\Delta^5$-3-acetoxy compounds with fuming nitric acid gives the corresponding 6-nitro-$\Delta^5$-3-acetoxy compounds convertible to 6-nitro-$\Delta^4$-3-keto compounds by treatment with a saponifying agent to form the free 3-hydroxy compound which was then oxidized to the $\Delta^4$-3-keto derivative.

Certain of the novel 6-nitro derivatives prepared as just set forth are intermediates for the production of the active compounds previously referred to. Thus 6-nitro-$\Delta^5$-androsten-3β,17β-diol is oxidized to 6-nitro-$\Delta^4$-androsten-3,17-dione which is selectively reduced at C–17 to form 6-nitro-testosterone. The acetate of dehydroepiandrosterone is transformed into the corresponding 6-nitro derivative which is then treated to convert the 17-keto group into either the 17α-lower alkyl or ethinyl 17β-hydroxy group. Oxidation of the 3-hydroxy to 3-keto then produced the desired 6-nitro 17α-lower alkyl or 17α-ethinyl testosterone. Similarly treatment of pregnenolone acetate gave 6-nitro-progesterone and treatment of a diester of $\Delta^5$-pregnen-3β,17α-diol-20-one gave the corresponding ester of 6-nitro-17α-hydroxy-progesterone. Preferably for this purpose a 3-acetate-17-lower fatty acid ester was used as the starting material so that the final product was the corresponding 17α-lower fatty acid ester of 6-nitro-17α-hydroxy-progesterone. Similarly by starting from the tetracetate of $\Delta^5$-pregnen-3β,17α,20,21-tetrol and its 9α-halo derivative there was prepared the corresponding 6-nitro-compounds. Selective saponification of the 6-nitro-compounds at C–3, C–20 and C–21, followed by selective reacetylation at C–21 gave the 17,21-diacetates. The free hydroxyl groups at C–3 and C–20 were then oxidized to keto groups to prepare the 17,21-diacetate of 6-nitro-cortisone and its 9α-halo analogues and the free compounds were prepared by saponification.

The modification employing 3-enol ethers or 3-enol esters also involves the production of certain novel intermediates. Thus a 3-enol-alkyl ether or a 3-enol ester of Reichsteins substance "S" ($\Delta^4$-pregnen-17α,21-diol-3,20-dione) further esterified at 17 and 21 upon treatment with nitric acid gave the important intermediate, the 17,21-diester of 6β-nitro-$\Delta^4$-pregnen-17α,21-diol-3,20-dione. Saponification of the ester groups with alkali inverted the 6β-nitro group and gave 6α-nitro-$\Delta^4$-pregnen-17α,21-diol-3,20-dione. By conventional treatment with adrenal tissue using the conditions set forth in U.S. Patent No. 2,671,752, granted March 9, 1954, this compound was transformed to the cortical hormone 6α-nitro-$\Delta^4$-pregnen-11β,17α,21-triol-3,20-dione. Further in indifferent order the compound was also provided with an additional double bond in C–1(2) by dehydrogenation with selenium dioxide or by reaction with corynebacterium Simplex under the conditions set forth in U.S. Patent No. 2,837,464, granted June 3, 1958. Further the oxidation of the 11β-hydroxy group of the corresponding 6α-nitro-11β-hydroxy compounds gave the corresponding 11-keto compounds.

The novel compounds of the present invention may therefore be illustrated by the following formula insofar as they relate to compounds of the androstane series including intermediates and hormone products.

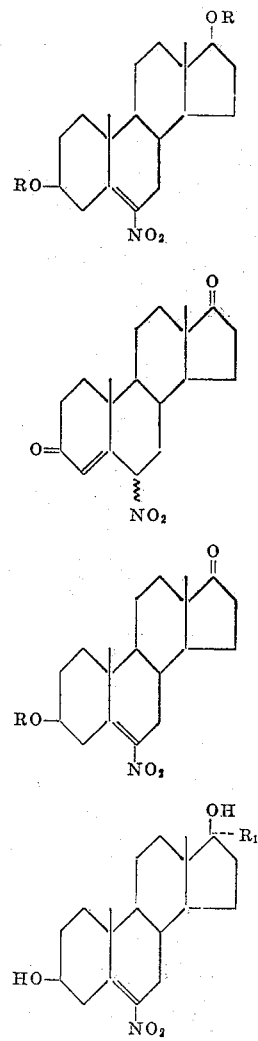

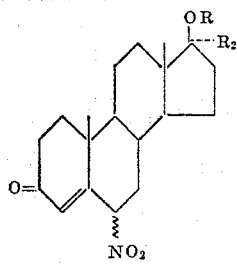

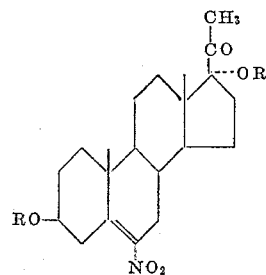

and

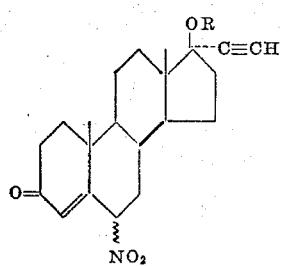

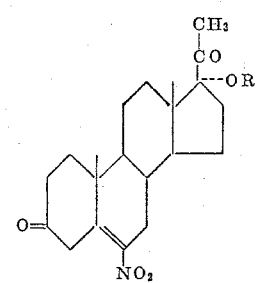

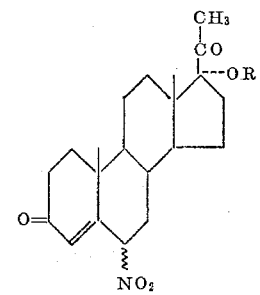

In the above formula R represents hydrogen or an ester group of a hydrocarbon carboxylic acid of less than 12 carbon atoms such as acetate, propionate, cyclopentylpropionate, benzoate, etc. $R_1$ represents ethinyl or lower alkyl, such as methyl, ethyl or propyl. $R_2$ represents lower alkyl or hydrogen.

The novel compounds of the present invention including progestational pregnane derivatives and intermediates therefor may be represented by the following formula:

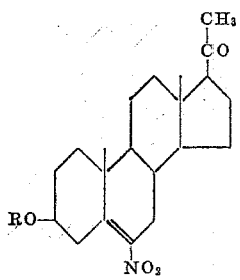

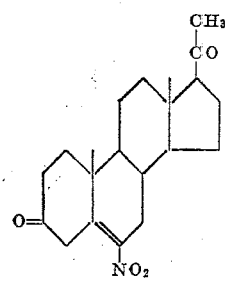

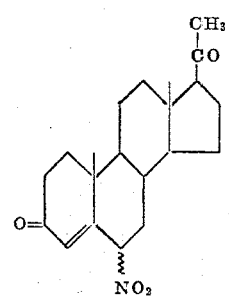

In the above formula R represents the same groups as heretofore set forth.

The novel compounds of the present invention including the cortical, anti-inflammatory pregnene derivatives and intermediates for their production may be illustrated as follows:

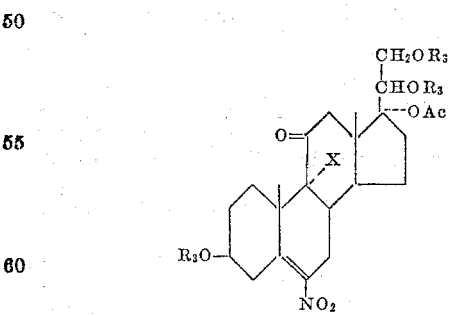

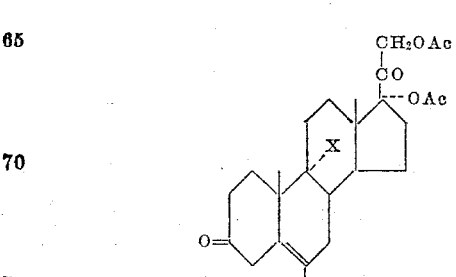

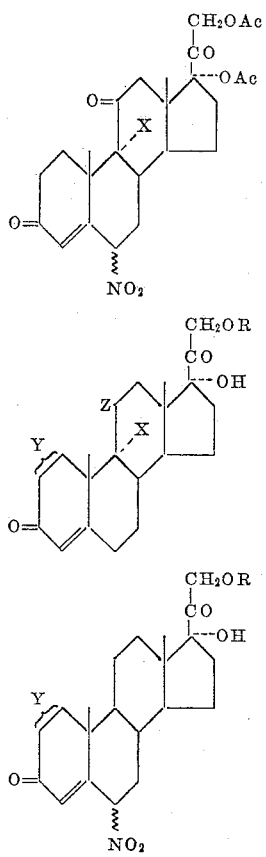

In the above formula R represents the same groups as heretofore. Ac represents acetate. $R_3$ represents hydrogen or acetate. X represents hydrogen or the halogen radicals chloro, bromo or fluoro and preferably represents fluoro. Y represents a double bond or a single bond between C-1 and C-2. Z represents 11-keto or 11β-hydroxy.

In general the process for the production of the aforementioned compounds or their intermediates may be illustrated by the following equations:

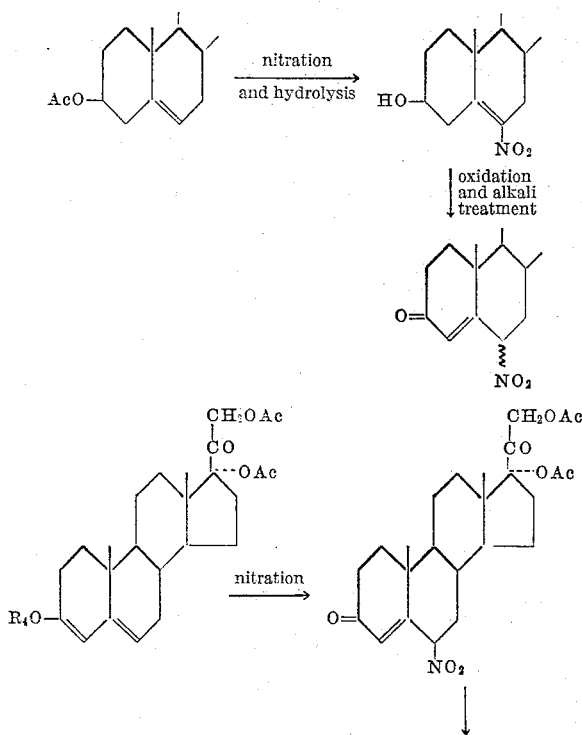

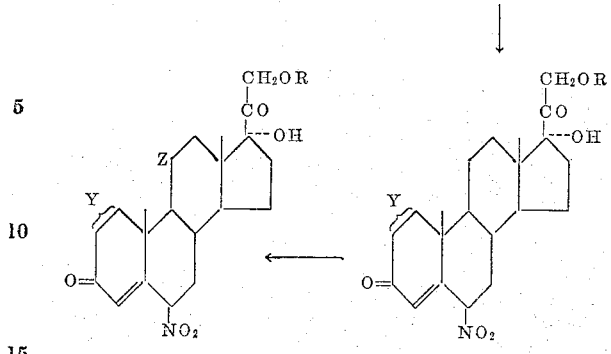

In the above equations Ac, Y, Z and R represent the same groups as heretofore. $R_4$ represents lower fatty acid acyl or alkyl.

In practicing the process outlined in the first equation above, which for the sake of simplicity shows only rings A and B of the steroid molecule, a $\Delta^5$-3-acetoxy steroid, which may have other hydroxy groups preferably in esterified form, is treated with fuming nitric acid. Preferably the nitric acid is added at temperatures of the order of 5° C. or lower and with the starting material in ether solution. The reaction mixture is then stirred for about 3 hours at room temperature. After conventional separation and purification the corresponding 3-acetoxy-6-nitro-$\Delta^5$-compound is obtained and is conventionally saponified as with methanolic potassium hydroxide to the free 3-alcohol. The alcohol derivative is then oxidized as with chromium trioxide in sulfuric acid and the resultant oxidation product is treated with base to give 3-keto-6-nitro-$\Delta^4$-compound as indicated.

In practicing the process outlined in the second equation above, the 3-enol lower alkyl ether or the 3-enol ester of a 17,21-diester of $\Delta^4$-pregnen-17α,21-diol-3,20-dione such as the triacetate of $\Delta^{3,5}$-pregnadien-3,17α,21-triol-20-one is dissolved in ether, the solution is cooled to about 0° C. and fuming nitric acid is added dropwise. The reaction mixture is agitated for a period of about 1 hour while maintaining a temperature of between about 0° C. and about 5° C. After conventional separation and purification there is obtained the diacetate of 6β-nitro-$\Delta^4$-pregnen, 17α,21-diol-3,20-dione. Treatment with base under low temperature gave the 6α-nitro-$\Delta^4$-pregnen-17α,21-diol-3,20-dione and conventional esterification gave the 21-esters of this last compound with hydrocarbon carboxylic acids of less than 12 carbon atoms such as the acetate. This acetate on treatment with selenium dioxide gave the corresponding 1-dehydro derivative which on treatment with adrenal tissue after saponification, gave the 11β-hydroxy derivative i.e. 6α-nitro-prednisolone. In the alternative the 11β-hydroxylation could be first performed to give 6α-nitrohydrocortisone and this compound dehydrogenated to 6α-nitro-prednisolone. By conventional oxidation of the 11β-hydroxy group there was prepared 6α-nitro-cortisone and 6α-nitro-prednisone. The 21-esters of these compounds with hydrocarbon carboxylic acids of less than 12 carbons were also prepared by conventional esterification.

The following "preparations" illustrate the production of starting compounds.

PREPARATION I

A mixture of 5 g. of the 21-acetate of cortisone, 250 cc. of acetic anhydride and 3g. of p-toluenesulfonic acid was kept at room temperature for 70 hours with occasional stirring and then poured into water. The precipitate was collected, washed with water to neutral, air dried and recrystallized from methanol, thus giving the triacetate of $\Delta^{3,5}$-pregnadien-3,17α,21-triol-11,20-dione.

Through the same reaction we obtained, from 9α-fluorocortisone, the triacetate of 9α-fluoro-$\Delta^{3,5}$-pregnadien-3,17α,21-triol-11,20-dione.

4 g. of each of the above compounds was dissolved in 200 cc. of methanol, cooled in an ice bath and slowly treated with a solution of 2 g. of sodium borohydride in 20 cc. of water, with stirring and maintaining the temperature of the mixture at around 0° C. The mixture was stirred for 2 hours further, neutralized with acetic acid, concentrated under reduced pressure to a volume of approximately 30 cc. and diluted with 200 cc. of water. The precipitate was collected, washed with water, dried and dissolved in 30 cc. of pyridine and 4 cc. of acetic anhydride was added. The mixture was kept overnight at room temperature and poured into water; the precipitate was collected and recrystallized from acetone-hexane, thus furnishing the tetraacetate of $\Delta^5$-pregnen-3$\beta$,17$\alpha$,20,21-tetrol-11-one or the tetraacetate of 9$\alpha$-fluoro-$\Delta^5$-pregnen-3$\beta$,17$\alpha$,20,21-tetrol-11-one, respectively.

PREPARATION II 10 g. of the diacetate of $\Delta^4$-pregnen-17$\alpha$,21-diol-3,20-dione, 30 cc. of acetyl chloride and 30 cc. of acetic anhydride were refluxed for 3 hours. The reaction mixture was then evaporated under reduced pressure and the residue was purified by recrystallization from a mixture of methanol and chloroform to give the triacetate of $\Delta^{3,5}$-pregnadien-3,17$\alpha$,21-triol-20-one.

The following specific examples serve to illustrate but are not intended to limit the present invention.

Example I

A cooled solution of 1.5 g. of the diacetate of $\Delta^5$-androsten-3$\beta$,17$\beta$-diol in 50 cc. of ether was treated dropwise with stirring with 15 cc. of fuming nitric acid, maintaining the temperature below 5° C. The mixture was stirred for 3 hours at room temperature and poured into ice water; the ether layer was separated, washed with 5% sodium carbonate solution and evaporated to dryness. The residue was purified by chromatography, thus giving 700 mg. of the diacetate of 6-nitro-$\Delta^5$-androsten-3$\beta$,17$\beta$-diol, M.P. 169–170° C., $[\alpha]_D$ —86° (chloroform), infrared absorption maximum: 1725 cm.$^{-1}$ (characteristic band of acetyl groups) and 1512 cm.$^{-1}$ (characteristic band of the C=C—NO$_2$ grouping).

A solution of 1 g. of this diacetate (M.P. 157–160° C.) in 50 cc. of 1% methanolic potassium hydroxide was refluxed for half an hour under an atmosphere of nitrogen, cooled, neutralized with acetic acid and concentrated under reduced pressure to a volume of 10 cc. It was diluted with 60 cc. of water and the precipitate was collected, washed with water, dried and recrystallized from acetone-hexane, thus yielding the free 6-nitro-$\Delta^5$-androstene-3$\beta$,17$\beta$-diol.

500 mg. of the above diol was dissolved in 25 cc. of acetone, cooled to 0° C. and mixed with a reagent prepared from 200 mg. of chromium trioxide, 0.20 cc. of concentrated sulfuric acid and 0.5 cc. of water, which was added dropwise, under stirring and keeping the temperature below 0° C., in the course of 2 minutes. The stirring was continued for 10 minutes further at 0° C. and then the mixture was diluted with water and extracted with ether. The extract was washed with water, dried over anhydrous sodium sulfate, filtered and evaporated to dryness. The residue was dissolved in 100 cc. of methanol, mixed with 10 drops of a 5% sodium hydroxide solution and kept overnight at room temperature. The mixture was neutralized with acetic acid, concentrated to 30 cc. under vacuum, and diluted with water; the precipitate was collected, washed with water and recrystallized from acetone-hexane, thus producing 6-nitro-$\Delta^4$-androsten-3,17-dione.

500 mg. of this dione was dissolved in 50 cc. of methanol, cooled to 0° C. and treated with 380 mg. of powdered sodium borohydride in small portions at a time, with stirring and keeping the temperature at 0° C. The stirring was continued for 1 hour further at 0° C., the mixture was neutralized with acetic acid, diluted with water and the precipitate was collected, washed, dried and recrystallized from acetone-hexane. There was thus obtained 6-nitro-testosterone.

Example II

By applying the method of Example I to the acetate of dehydroepiandrosterone, there was obtained the acetate of 6-nitro-dehydroepiandrosterone, then 6-nitro-dehydroepiandrosterone and finally 6-nitro-$\Delta^4$-androsten-3,17-dione, identical to the one obtained in Example I.

Example III

A solution of 1 g. of the acetate of 6-nitro-dehydroepiandrosterone, obtained in accordance with the previous example, in 50 cc. of absolute benzene was treated with 5 cc. of a 3 N ether solution of methyl magnesium bromide and the mixture was refluxed for 2 hours, poured into ice water, acidified with dilute hydrochloric acid and extracted with ethyl acetate. The extract was washed with water to neutral, dried over anhydrous sodium sulfate, filtered and evaporated to dryness under reduced pressure. Crystallization of the residue from acetone-hexane afforded 6-nitro-17$\alpha$-methyl-$\Delta^5$-androstene-3,17$\beta$-diol.

This diol was treated with the oxidizing reagent and then with sodium hydroxide, such as has been described in Example I, to produce, after crystallization of the product from ethyl acetate, 6-nitro-17$\alpha$-methyl-testosterone.

Example IV

A mixture of 30 cc. of dry benzene and 10 cc. of a recently prepared solution of 300 mg. of ethyl lithium, was treated dropwise with a solution of 500 mg. of the acetate of 6-nitro-dehydroepianodrosterone, with stirring. The mixture was refluxed for 20 hours, cooled, diluted with water and the organic layer was separated and washed with water, dried over anhydrous sodium sulfate, filtered and evaporated to dryness under reduced pressure. Crystallization of the residue from acetone-hexane gave 6-nitro-17$\alpha$-ethyl-$\Delta^5$-androstene-3$\beta$,17$\beta$-diol.

This diol was then treated with the oxidizing reagent and with sodium hydroxide, as described for these operations in Example I. The crude product crystallized from acetone-hexane to yield 6-nitro-17$\alpha$-ethyl-testosterone.

Example V

When in the method of the previous example the ethyl lithium was substituted by propyl lithium, there was prepared 6-nitro-17$\alpha$-propyl-testosterone.

Example VI

A solution of 500 mg. of the acetate of 6-nitro-dehydroepiandrosterone in 20 cc. of anhydrous benzene was added, under an atmosphere of nitrogen to a cooled solution of 500 mg. of potassium metal in 25 cc. of anhydrous t-butanol which had been prepared under nitrogen. The stream of nitrogen was then substituted by a stream of dry purified acetylene and the acetylene treatment was continued for 40 hours. The mixture was poured into 100 cc. of dilute hydrochloric acid, the organic solvents were removed by steam distillation and the precipitate was filtered from the cooled mixture. Recrystallization from acetone-hexane produced 6-nitro-17$\alpha$-ethinyl-$\Delta^5$-androsten-3$\beta$,17$\beta$-diol, which was oxidized and then treated with sodium hydroxide, by the method described for these reactions in Example I, to produce 6-nitro-17$\alpha$-ethinyl-testosterone.

Example VII 1.5 g. of the acetate of $\Delta^5$-pregnen-3$\beta$-ol-20-one was treated with fuming nitric acid, exactly as described in Example I, to form the acetate of 6-nitro-$\Delta^5$-pregnen-3$\beta$-ol-20-one, in over 50% yield, M.P. 183–184° C., $[\alpha]_D$ —47° (chloroform), characteristic infrared bands at 1720 cm.$^{-1}$ (acetoxyl group), 1700 cm.$^{-1}$ (keto group)

and 1520 cm.$^{-1}$ (corresponding to the C=C—NO$_2$ group).

600 mg. of the above acetate was refluxed in a mixture of 25 cc. of 1% methanolic potassium hydroxide for 30 minutes under an atmosphere of nitrogen, cooled, neutralized with acetic acid, diluted with water and extracted with ether. The extract was washed with water, dried over anhydrous sodium sulfate, filtered and evaporated to dryness. There was thus obtained the crude 6-nitro-Δ$^5$-pregnen-3β-ol-20-one.

The above product was treated with the oxidizing reagent and then with sodium hydroxide, by the method described in Example I. Recrystallization of the crude product from acetone-hexane yielded 6-nitro-progesterone, M.P. 166–168° C., ultraviolet absorption: λ max. 232–234, log E. 4.10.

*Example VIII*

By an analogous method to that of Example I, the diacetate of Δ$^5$-pregnen-3β,17α-diol-20-one was nitrated to give the diacetate of 6-nitro-Δ$^5$-pregnen-3β,17α-diol-20-one. This was dissolved in 50 parts of 1% potassium hydroxide in methanol and kept standing at room temperature for 1 hour. The mixture was neutralized with acetic acid and the product was worked up by the method described in the previous example. There was thus obtained the crude 17-acetate of 6-nitro-Δ$^5$-pregnen-3β,17β-diol-20-one, which was then treated with the oxidizing reagent and sodium hydroxide, in accordance with the method of Example I, to obtain the acetate of 6-nitro-17α-hydroxy-progesterone.

If instead of the diacetate, there is used a mixed diester of Δ$^5$-pregnen-3β,17α-diol-20-one as starting material, the final product obtained was the corresponding 17-ester of 6-nitro-17α-hydroxy-progesterone; for example, starting from the 3-acetate-17-propionate of Δ$^5$-pregnen-3β,17α-diol-20-one, there was obtained the propionate of 6-nitro-17α-hydroxy-progesterone.

*Example IX*

1 g. of the tetraacetate of Δ$^5$-pregnen-3β,17α,20,21-tetrol-11-one of Preparation I, was treated with fuming nitric acid, in accordance with Example I, to form the tetraacetate of 6-nitro-Δ$^5$-pregnen-3β,17α,20,21-tetrol-11-one. The latter was dissolved in 100 cc. of 1% methanolic potassium hydroxide and kept standing at room temperature for 1 hour. By the method of extraction described in Example VII there was isolated the crude 17-acetate of 6-nitro-Δ$^5$-pregnen-3β,17α,20,21-tetrol-20-one. This was dissolved in 10 cc. of pyridine, cooled to 0° C. and treated with 1.1 mols of acetic anhydride. The mixture was kept for 18 hours at 0° C. and then 2 hours at room temperature. It was diluted with water, extracted with ethyl acetate, washed with dilute hydrochloric acid, 5% sodium carbonate solution and water, dried over anhydrous sodium sulfate, filtered and evaporated to dryness. There was thus obtained the crude 17,21-diacetate of 6-nitro-Δ$^5$-pregnen-3β,17α,20,21-tetrol-11-one. In turn, this was treated with 2.2 mols of the oxidizing reagent (chromium trioxide in aqueous sulfuric acid) as has been described in Example I.

The total oxidation product, that is, the mixture of the 17,21-diacetate of 6-nitro-Δ$^5$-pregnen-17α,21-diol-3,11,20-trione and of 6-nitro-cortisone, was dissolved in 100 cc. of 1% methanolic potassium hydroxide, previously cooled to 0° C. The mixture was kept for one hour at 0–5° C., neutralized with acetic acid, concentrated to ca. 30 cc. under reduced pressure, diluted with 200 cc. of water and extracted with ethyl acetate. The extract was washed with water, dried over anhydrous sodium sulfate, filtered and evaporated to dryness. Crystallization of the residue from acetone-hexane yielded 6-nitro-cortisone.

*Example X*

When in the previous example the tetraacetate of Δ$^5$-pregnen-3β,17α,20,21-tetrol-11-one was substituted by that of its 9α-fluoro analogue, there was obtained 6-nitro-9α-fluoro-cortisone as final product.

*Example XI*

A mixture of 1 g. of 6-nitro-cortisone, 10 cc. of pyridine and 0.8 cc. of acetic anhydride was kept for 2 hours at room temperature, poured into water and the mixture was heated on the steam bath for half an hour. After cooling, the precipitate was collected, washed with water, dried and recrystallized from acetone-hexane, thus giving the 21-acetate of 6-nitro-cortisone.

By an analogous method there were prepared other 21-esters of 6-nitro-cortisone by treatment of its pyridine solution with the corresponding acid anhydride or chloride, preferably derived from a hydrocarbon carboxylic acid having 2 to 12 carbon atoms including the 21-propionate, benzoate and cyclopentylpropionate.

*Example XII*

By the method of the previous example 6-nitro-9α-fluoro-cortisone was acetylated to form the corresponding 21-acetate.

*Example XIII*

Following the method of esterification described in Example XI, there were prepared esters of 6-nitro-testosterone, particularly the acetate, propionate, cyclopentylpropionate, and benzoate.

*Example XIV*

5 g. of the 3,17,21-triacetate of Δ$^{3,5}$-pregnadien-3,17α,21-triol-20-one (Preparation II) was dissolved in 150 cc. of absolute ether, the solution was cooled to 0° C., and 75 cc. of fuming nitric acid was added drop by drop, with agitation, over a period of 1 hour with the temperature maintained between 0 and 5° C. The reaction mixture was poured into ice water and the ether layer was separated. The aqueous layer was washed with ether and the washing was combined with the ether layer. The combined ether solution was washed with water, then with a water solution of sodium bicarbonate and dried over anhydrous sodium sulfate. The ether was then evaporated and the residue recrystallized from a mixture of ethyl acetate and acetone. The diacetate of 6β-nitro-Δ$^4$-pregnen-17α,21-diol-3,20-dione was obtained.

3 g. of the above compound was agitated with a cold solution of 600 mg. of potassium hydroxide in 30 cc. of methanol under an atmosphere of nitrogen at a temperature of 0° C. for 1 hour. The mixture was then acidified with acetic acid, diluted with water and extracted with ether. The extract was washed with water, dried over anhydrous sodium sulfate and the ether evaporated. The residue after crystallization from acetone-hexane was the 6α-nitro-Δ$^4$-pregnen-17α,21-diol-3,20-dione.

2 g. of the above compound was dissolved in 20 cc. of pyridine, 2 cc. of acetic anhydride were added and the mixture was maintained at room temperature over night. The reaction mixture was then poured into water and heated on a steam bath for ½ hour, then cooled and extracted repeatedly with ether. The extract was washed with dilute hydrochloric acid, with water, with a 5% sodium carbonate solution and finally again with water, dried over anhydrous sodium sulfate and the ether evaporated. The residue was the crude 21-acetate of 6α-nitro-Δ$^4$-pregnen-17α,21-diol-3,20-dione and was utilized for the next step without further purification. The pure 6α-nitro-Δ$^4$-pregnen-17α,21-diol-3,20-dione was obtained by recrystallization from acetone-hexane.

2 g. of the crude 21-acetate of 6α-nitro-Δ⁴-pregnen-17α,21-diol-3,20-dione was mixed with 100 cc. of tertiary butanol, 6.06 g. of selenium dioxide and 0.2 cc. of pyridine. The mixture was then refluxed in an atmosphere of nitrogen for 20 hours. The mixture was cooled, filtered through celite, and the precipitate washed with hot tertiary butanol. The filtrate and the washing were combined and the solvent evaporated at reduced pressure. The residue was triturated with water, the solids separated and washed with water, dried, and then purified by chromatography using 100 g. of neutral alumina. The 21-acetate of 6α-nitro-Δ$^{1,4}$-pregnadien-17α,21-diol-3,20-dione is obtained.

1 g. of the above compound is mixed with 10 cc. of absolute methanol, and a solution of sodium methoxide prepared using 5 cc. of absolute methanol. The mixture was agitated in a nitrogen atmosphere and a temperature between 0 and 5° C. for one hour. The reaction mixture was then poured into 100 cc. of ice water saturated with sodium chloride and containing 0.5 cc. of acetic acid. The precipitate was filtered, washed with water, and upon recrystallization from acetone-hexane there was obtained the 6α-nitro-Δ$^{1,4}$-pregnadien-17α,21-diol-3,20-dione.

The following solutions are prepared using as a solvent distilled water: (A) a combination of 425 cc. of an aqueous solution of 1.74% di-basic sodium phosphate ($K_2HPO_4$) with 75 cc. of an aqueous solution of 1.38% mono-basic sodium phosphate. Solution (B), the dilution to 5 lt. of a combination of 1 lt. of an aqueous solution of 4.5% sodium chloride with 40 cc. of an aqueous solution of 5.75% potassium chloride and 10 cc. of an aqueous solution of 19.1% magnesium sulfate. Solution (C), 20.9 g. of fumaric acid is dissolved together with 14.4 g. of sodium hydroxide in a liter of water and the solution is diluted to 1.2 lt.

A mixture is made of 475 cc. of solution A with 4.32 lt. of solution B and 1.2 lt. of solution C.

By grinding there is obtained a homogeneous mass of the adrenal glands of recently slaughtered cattle and 3 kilos of this mass is mixed with 6 liters of the mixture just previously referred to and vigorously agitated. To the suspension of adrenal gland thus made, there is added 16 cc. of propyleneglycol containing 3 g. of 6α-nitro-Δ$^{1,4}$-pregnadien-17α,21-diol-3,20-dione. The reaction mixture is agitated at a temperature between 28 and 37° C., for 3 hours, added to 40 lt. of acetone, and agitated at room temperature for another hour.

The solids are filtered off and washed with acetone using 10 lt. of acetone for the washing. The washing and the filtrate are combined and the solution thus formed is concentrated to a volume of approximately 5 lt. under reduced pressure and under a temperature of less than 30° C. The liquid residue is washed with hexane utilizing 4 lt. of hexane for the washing. The residue after washing is extracted with 3 lt. of methylene chloride. The extract is washed with water, dried over anhydrous sodium sulfate, filtered and concentrated to a volume of 300 cc. under reduced pressure and at a temperature below room temperature. The concentrated solution is passed through a column containing a mixture of 90 g. of celite and 90 g. of silica gel, the column is washed with 3 lt. of methylene chloride and 100 cc. of acetone and finally with a mixture of 1600 cc. of methylene chloride and 400 cc. of acetone. In the last washing there is eluted the 6α-nitro-prednisolone. In order to obtain pure 6α-nitro-prednisolone the solvent was evaporated and the residue crystallized from ether.

To a solution of 1 g. of 6-nitro-prednisolone in 10 cc. of pyridine, 1.5 cc. of propionic anhydride was added and the reaction mixture maintained at room temperature overnight. The reaction mixture was then poured into water, heated for one hour on a steam bath, cooled, precipitate filtered, and washed with water and then recrystallized from acetone-hexane. There was thus obtained the 21-propionate of 6α-nitro-prednisolone. A mixture of 0.5 g. of the aforementioned compound with 50 cc. of glacial acetic acid, was combined by dropwise addition with a solution of 200 mg. of chromium trioxide in 10 cc. of 80% acetic acid. During the addition, the mixture was agitated and maintained at a room temperature for 2 hours, diluted with water, the precipitate filtered and washed with water, and then recrystallized from acetone-hexane. There was thus obtained the 21-propionate of 6α-nitro-prednisone. By saponification of the propionoxy group of the compound just mentioned, by the method previously described for saponification of the acetoxy group of the 21-acetate of 6α-nitro-Δ$^{1,4}$-pregnadien-17α,21-diol-3,20-dione, there obtained the free 6α-nitro-prednisone.

Example XV

If there is substituted in the previous example the 17,21-diacetate of the 3-ethoxy-Δ$^{3,5}$-pregnadien-17α,21-diol-20-one instead of the 3,17,21-triacetate of Δ$^{3,5}$-pregnadien-3,17α,21-triol-20-one there is obtained after the reaction with fuming nitric acid the diacetate of 6β-nitro-Δ⁴-pregnen-17α,21-diol-3,20-dione identical in all respects with the compound produced according to Example I.

Example XVI 3 g. of the 6α-nitro-Δ⁴-pregnen-17α,21-diol 3,20-dione obtained according to Examples XIV and XV were incubated with adrenal glands of cattle in the same manner as described in Example XIV and similarly separated and purified. There was obtained 6α-nitrohydrocortisone. Using the method of Example XIV there was also prepared the 21-cyclopentylpropionate of this compound which is oxidized to the 21-cyclopentylpropionate of 6α-nitro-cortisone.

Example XVII

In various experiments there was prepared other C-21 esters of hydrocarbon carboxylic acids of less than 12 carbon atoms of 6α-nitro-Δ⁴-pregnen-17α,21-diol-3,20-dione including the benzoate, the cyclopentylpropionate, the butyrate, etc. and by dehydrogenation of these 21-esters there was obtained the corresponding esters of 6α-nitro-Δ$^{1,4}$-pregnadien-17α,21-diol-3,20-dione. Saponification of the ester group gave the free 6α-nitro-Δ$^{1,4}$-pregnadien-17α,21-diol-3,20-dione identical with the compound obtained according to Example XIV. The same conventional methods of esterification of the 21-hydroxyl group of 6α-nitro-Δ⁴-pregnen-17α,21-diol-3,20-dione as well as the same dehydrogenating and saponification methods were used as described specifically in Example XIV.

Example XVIII

When there is substituted in the methods of Examples XIV and XVII for the esterification of the hydroxyl group at C-21 of the 6α-nitro-hydrocortisone or the 6α-nitro-prednisolone, other anhydrides of carboxylic acids of less than 12 carbon atoms, the corresponding esters were produced including acetates, propionates, benzoates, cyclopentylpropionates, etc. In the same way there was obtained the 21-esters of 6α-nitro-hydrocortisone and 6α-nitro-prednisolone respectively and upon subsequent oxidation with chromic acid the corresponding esters of 6α-nitro-cortisone and 6α-nitro-prednisone. Using the same method of saponification described in Example XIV there was obtained the free 6α-nitro-prednisone.

Example XIX

In other experiments the saponification of the ester group at C-21 of 6α-nitro-Δ$^{1,4}$-pregnadien-17α,21-diol-3,20-dione and 6α-nitro-prednisone respectively was achieved by treating 1 g. of the steroid with a 10 cc. solution in methanol of potassium hydroxide of 1% for one hour at a temperature between 0 and 5° C. in an atmosphere of nitrogen.

We claim:
1. Compounds of the following formula:

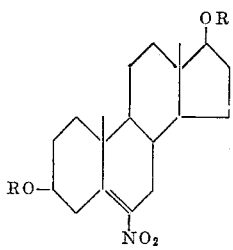

wherein R is selected from the group consisting of hydrogen and a hydrocarbon carboxylic acid acyl group of less than 12 carbon atoms.
2. 6-nitro-Δ⁵-androsten-3β,17β-diol.
3. The diacetate of 6-nitro-Δ⁵-androsten-3β,17β-diol.
4. 6-nitro-Δ⁴-androsten-3,17-dione.
5. Compounds of the following formula:

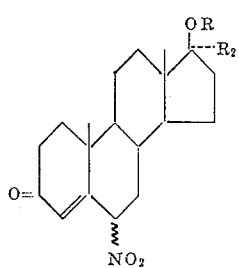

wherein R is selected from the group consisting of hydrogen and a hydrocarbon carboxylic acid acyl group of less than 12 carbon atoms and $R_2$ is selected from the groups consisting of hydrogen and lower alkyl.
6. 6-nitro-testosterone.
7. The hydrocarbon carboxylic acid esters of less than 12 carbon atoms of 6-nitro-testosterone.
8. 6-nitro-17α-methyl-testosterone.
9. 6-nitro-17α-ethyl-testosterone.
10. 6-nitro-17α-propyl-testosterone.
11. Compounds of the following formula:

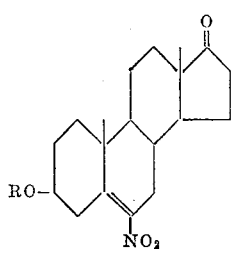

wherein R is selected from the group consisting of hydrogen and a hydrocarbon carboxylic acid acyl group of less than 12 carbon atoms.
12. Compounds of the following formula:

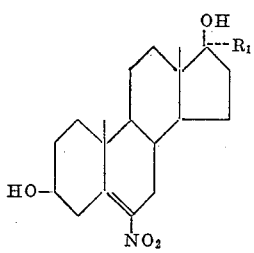

wherein $R_1$ is selected from the group consisting of lower alkyl and ethinyl.

13. Compounds of the following formula:

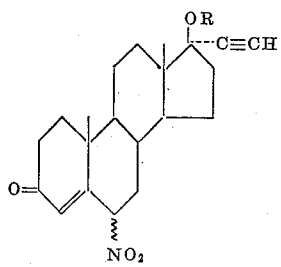

wherein R is selected from the group consisting of hydrogen and a hydrocarbon carboxylic acid acyl group of less than 12 carbon atoms.
14. 6 nitro-17α-ethinyl-testosterone.
15. Compounds of the following formula:

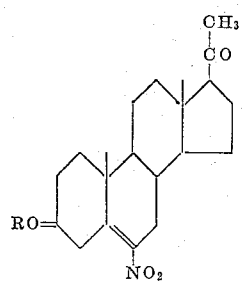

wherein R is selected from the group consisting of hydrogen and a hydrocarbon carboxylic acid acyl group of less than 12 carbon atoms.
16. 6-nitro-Δ⁵-pregnen-3β-ol-20-one.
17. The acetate of 6-nitro-Δ⁵-pregnen-3β-ol-20-one.
18. 6-nitro-progesterone.
19. Compounds of the following formula:

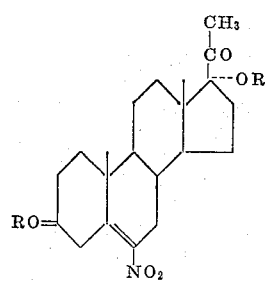

wherein R selected from the group consisting of hydrogen and a hydrocarbon carboxylic acid acyl group of less than 12 carbon atoms.
20. The diacetate of 6-nitro-Δ⁵-pregnen-3β,17α-diol-20-one.
21. The 3-acetate-17-propionate of 6-nitro-Δ⁵-pregnen-3β,17α-diol-20-one.
22. Compounds of the following formula:

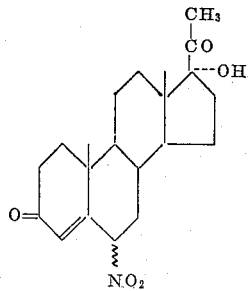

wherein R is selected from the group consisting of hydrogen and a hydrocarbon carboxylic acid acyl group of less than 12 carbon atoms.
23. 6-nitro-17α-hydroxyprogesterone.
24. The hydrocarbon carboxylic acid esters of less than 12 carbon atoms of 6-nitro-17α-hydroxyprogesterone.

25. Compounds of the following formula:

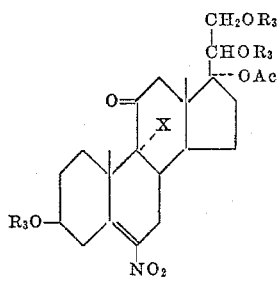

wherein Ac represents acetyl, $R_3$ is selected from the group consisting of hydrogen and acetyl and X is selected from the group consisting of hydrogen, chloro, and fluoro.

26. Compounds of the following formula:

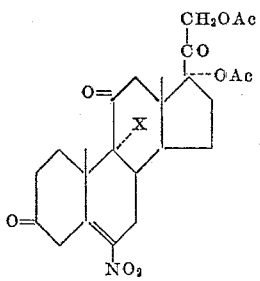

wherein Ac represents acetyl, and X is selected from the group consisting of hydrogen, chloro and fluoro.

27. Compounds of the following formula:

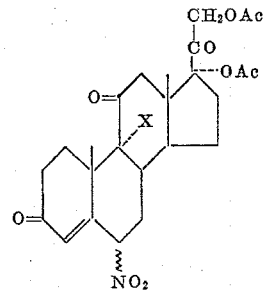

wherein Ac represents acetyl and X is selected from the group consisting of hydrogen, chloro and fluoro.

28. Compounds of the following formula:

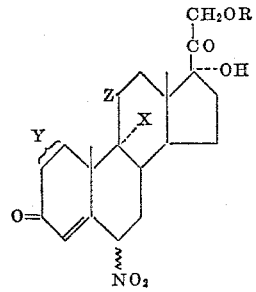

wherein R is selected from the group consisting of hydrogen and a hydrocarbon carboxylic acyl group of less than 12 carbon atoms, Y is selected from the group consisting of a double bond between C–1 and C–2 and a saturated linkage between C–1 and C–2, X is selected from the group consisting of hydrogen, chloro and fluoro, and Z is selected from the group consisting of $$\overset{OH}{\underset{H}{|}}$$

and =O.

29. 6-nitro-cortisone.
30. The 21-hydrocarbon carboxylic acid esters of 6-nitro-cortisone.
31. 6-nitro-9α-fluoro-cortisone.
32. The 21-hydrocarbon carboxylic acid esters of 6-nitro-9α-fluoro-cortisone.
33. 6-nitro-9α-chloro-cortisone.
34. The 21-hydrocarbon carboxylic acid esters of 6-nitro-9α-chloro-cortisone.
35. 6-nitro-prednisone.
36. The 21-hydrocarbon carboxylic acid esters of 6-nitro-prednisone.
37. 6-nitro-prednisolone.
38. The 21-hydrocarbon carboxylic acid esters of 6-nitro-prednisolone.
39. 6α-nitro-cortisone.
40. The 21-hydrocarbon carboxylic acid esters of 6α-nitro-cortisone.
41. 6α-nitro-hydrocortisone.
42. The 21-hydrocarbon carboxylic acid esters of 6α-nitro-hydrocortisone.
43. 6α-nitro-prednisone.
44. The 21-hydrocarbon carboxylic acid esters of 6α-nitro-prednisone.
45. 6α-nitro-prednisolone.
46. The 21-hydrocarbon carboxylic acid esters of 6α-nitro-prednisolone.
47. Compounds of the following formula:

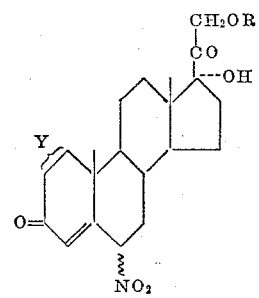

wherein R is selected from the group consisting of hydrogen and a hydrocarbon carboxylic acyl group of less than 12 carbon atoms, and Y is selected from the group consisting of a double bond between C–1 and C–2 and a saturated linkage between C–1 and C–2.

48. The hydrocarbon carboxylic diesters of less than 12 carbon atoms of 6β-nitro-Δ⁴-pregnen-17α,21-diol-3,20-dione.
49. 6α-nitro-Δ⁴-pregnen-17α,21-diol-3,20-dione.
50. 6α-nitro-Δ¹,⁴-pregnadien-17α,21-diol-3,20-dione.
51. The 21-mono hydrocarbon carboxylic esters of less than 12 carbon atoms of 6α-nitro-Δ⁴-pregnen-17α,21-diol-3,20-dione.
52. The 21-mono hydrocarbon carboxylic esters of less than 12 carbon atoms of 6α-nitro-Δ¹,⁴-pregnadien-17α,21-diol-3,20-dione.

References Cited in the file of this patent

UNITED STATES PATENTS

| 2,337,564 | Marker | Dec. 28, 1943 |
| 2,438,819 | Niederl | Mar. 30, 1948 |

OTHER REFERENCES

Anagnostopoulos et al.: "Nitration of Unsaturated Steroids," J. Am. Chem. Soc., vol. 76 (January 20, 1954), pages 532–6, pages 534 and 535 only needed.